United States Patent Office 2,956,878
Patented Oct. 18, 1960

2,956,878

PHOTOSENSITIVE POLYMERS AND THEIR APPLICATIONS IN PHOTOGRAPHY

Marie-Jose Susanne Michiels, Roger Paul Joseph Gaston Thiebaut, and Georges Achille Phlipot, Paris, France, assignors to Eastman Kodak Company, Rochester, N.Y., a corporation of New Jersey No Drawing. Filed Nov. 13, 1956, Ser. No. 621,522

9 Claims. (Cl. 96—33)

This invention relates to light-sensitive polymers and their use in photography and particularly in the photomechanical arts.

The light-sensitive polymers of the invention are film-forming polyesters derived from (2-propenylidene) malonic compounds and bi-functional glycols containing 2 to 12 carbon atoms. A (2-propenylidene) malonic compound has the general Formula I

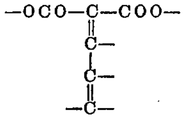

wherein the open bonds on the 2-propenylidene radical are attached to non-functional substituents (do not enter into polyesterification reactions) and the open bonds on the carboxyl radicals are attached to hydrogen or an alkyl group. Of course, the di-acid halides can also be employed under suitable circumstances.

The light-sensitive polymers of the invention are therefore particularly characterized in that they contain recurring units of the general Formula II

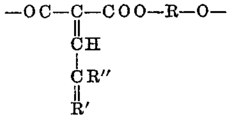

wherein R represents a bi-functional group of from 2 to 12 carbon atoms such as the hydrocarbon groups, ethylene, propylene, butylene, dodecylene, ethylene-O-ethylene, phenylene, etc., R′ represents a radical free of functional substituents (do not enter in polyesterification reactions), for example, a hydrocarbon group such as monocyclic and bicyclic arylidene groups of the benzene and naphthalene series, mononuclear and binuclear heterocyclic groups including specifically benzylidene, naphthylidene, ethylidene, furfurylidene, pyridyl, quinolyl, benzothiazolyl, etc., groups, and R″ is a hydrogen atom or lower alkyl group such as methyl or ethyl. R′ is not otherwise critical, and in order to maintain the light-sensitive character of the polymers, it is only necessary for the conjugated group =CR″—CH= to be attached to the polyester chain at the 2-position of the malonyl radical.

According to the invention, these polymers are prepared by condensation of a compound having the formula HO—R—OH, in which case R represents a bifunctional group as mentioned, with a diacid of the general Formula III

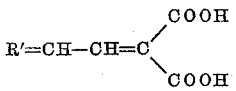

where R′ is as above-mentioned, or with a functional derivative of said acid, such as a diester.

It has been found that the new polymeric compounds according to the invention are photosensitive, in the sense that their exposure to light causes their being rendered insoluble. Thus, if a layer of one of these compounds, initially soluble in organic solvents, is applied onto a support and exposed photographically, the exposed areas become insoluble in these solvents. Consequently, the exposed product can be treated with a solvent that will eliminate the unexposed areas which have remained soluble, whereas the exposed areas which have become insoluble in these solvents will remain on the support. In this way a resist is obtained that can be utilized in the known way in the art of photomechanical reproduction.

The invention covers the industrial applications of the above-described polymeric compounds and especially the photosensitive products involving a support and a photosensitive layer of said compounds, as well as the photomechanical resist obtained by exposure and developing these photosensitive products.

The photosensitive products according to the invention display stable properties similar to those of the common silver halide photographic products, and they can therefore be prepared a long time before use, unlike the albumin or bichromated gelatin products that must be prepared at the time of use. Since the photosensitive agent is a synthesized product which is its own binding agent, it does not display the variations of properties that are observed among the different batches of gelatin or other products of natural origin. The speed of the products according to the invention is considerably greater than that of bichromated gelatin, and this speed can be increased even more by the incorporation of suitable sensitizers in the photosensitive layer. Moreover, certain of the polymeric compounds according to the invention are sensitive to radiations included in the visible spectral range, as indicated below, which makes it possible to avoid the use of mercury vapor lamps for the exposures.

The mechanical properties of the photosensitive products according to the invention are good and make it possible to use these products for most of the common photomechanical processes. For certain applications, where it is especially desirable to obtain a good adherence of the photosensitive layer to its support or a sufficient covering power with regard to the support, it may be advantageous to incorporate a non-photosensitive resin, of the type used, for example, for the preparation of protective lacquers for metals, in the photosensitive layer containing the polymeric compound according to the invention.

An important advantage of the products according to the invention is the relative ease of synthesizing the photosensitive agent. The polymeric compounds according to the invention can, in fact, be prepared according to the methods of polycondensation generally used for the synthesis of polyesters. These methods consist principally in causing diols or diphenols, for example, to react on a diacid or a corresponding diester in the presence of a catalyst.

Especially advantageous polymeric compounds are obtained by using, as the diacid of the general formula above, cinnamylidenemalonic acid of the formula

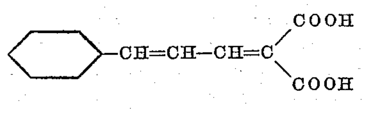

or a functional derivative of this acid. Some other examples of diacids of the formula above, that can be used according to the invention, are crotonylidenemalonic acid, γ-methylcrotonylidenemalonic acid, o-nitrocinnamylidenemalonic acid, naphthylallylidenemalonic acid, 2-furfurylidenemalonic acid, N-methylpyridylidene-2-ethylidenemalonic acid, N-methylquinolidene-2-ethylidenemalonic acid or N-methylbenzothiazolylidene-2-ethylidenemalonic acid, and the functional derivatives of these acids can likewise be used. For the polycondensations, free diacids or their diesters are advantageously used, although one can also react the diacids in the form of other functional derivatives, such as monoesters, dichlorides, monochlorides-monoesters, salts of ammonia and salts of volatile amines, etc. It is generally preferred to use the diesters rather than the diacids and to proceed by trans-esterification, which makes it possible to lower the temperature of reaction and thus to obtain resins that are less deteriorated and more polymerized.

The dihydroxy compounds used for polycondensation according to the invention are, advantageously, glycols containing about 2 to 12 carbon atoms such as ethylene glycol, diethylene glycol, triethylene glycol, propanediol-1,3, propanediol-1,2, butanediol-1,4, butanediol-2,3, pentanediol-1,5, 2,2-dimethylpropanediol-1,3, p-dihydroxymethylbenzene, diphenols, such as hydroquinone, decamethylene glycol, dodecamethylene glycol, etc.

All of these polycondensations are carried out by heating at ordinary pressure, followed by a heating in a vacuum (pressure at about 1 mm. Hg). The temperatures used generally include between 150° and 220° C. They have little influence on the molecular weight of the resin obtained, although this molecular weight generally increases with the duration of the heating.

The catalysts used according to the invention are those that are generally used for the preparation of macromolecular linear polyesters. As examples of suitable catalysts, butyl titanate, antimony oxide, etc. can be mentioned, and, in a general way, catalysts of the type used for alcoholysis and polycondensation of terephthalic esters. When a diacid is used as the starting material for direct polyesterification, then sulfuric acid, p-toluenesulfonic acid, etc. can be used as catalyst.

The polyesters obtained in this way according to the invention appear as hard, transparent resins of variable coloration according to the starting compounds used. They are insoluble in water, but they are soluble in most organic solvents, such as ketones, aldehydes, aromatic solvents, chlorinated solvents, pyridine, etc., but are not soluble alcohols, ethyl ether, isopropyl ether and petroleum ether.

After they have been exposed to light, these polyesters are insoluble in all of the aforementioned products and in acid baths used for engraving such as ferric chloride, nitric acid, etc. In addition, they may be dyed, which is advantageous, especially in typography, for making the image appear before the engraving.

For use in lithography, for example, a layer of a solution of the polymeric compound according to the invention in a solvent such as acetone or methyl glycol acetate, in a concentration varying between 5% and 10%, is applied onto the lithographic support, comprised of paper, grained aluminum, etc. The thus prepared photosensitive products are exposed behind a screened negative or to the beam of an actinic light for a few minutes (e.g., 5 to 8 minutes). The development is then effected in the usual manner by using as the solvent any one of the aforementioned solvents of the unexposed developing compound. After developing, the positive plate obtained may be inked in order to be used on a lithographic press. Since the macromolecular compounds according to the invention are lipophilic, the usual inks are suitable for this purpose. For a good reproduction of values, it is suitable, before use on the press, to pre-ink the plate, for example, by means of the following composition:

| | | |
|---|---|---|
| Lithographic ink | g | 200 |
| 5% solution of bitumen in trichloroethylene | cc | 200 |
| Trichloroethylene | cc | 300 |

As already indicated, the speed of the photosensitive products according to the invention may be increased by the addition of suitable sensitizers to the photosensitive layer. As examples of suitable sensitizers, we can mention 2-(benzoylmethylene)-1-methyl-β-naphthothiazole, 2-benzoylcarbethoxymethylene-1-methyl-β-naphthothiazole, 1-carbethoxy-2-keto-3-methyl-2-azabenzanthrone, eosin, etc. Some sensitizers are described, for example, in French Patents No. 1,086,257 of January 19, 1952, and No. 1,089,290 of October 14, 1953, U.S. Patents 2,610,-120 (nitro compounds), 2,690,966 (triphenylmethanes), 2,670,285 (anthrones), 2,670,287 (diaminobenzophenone imides, -diphenylmethanes, -diphenyl ketones, -diphenylcarbinols), 2,670,286 (quinones), and Robertson et al. U.S. patent application Serial No. 314,806, now U.S. Patent 2,732,301, granted January 24, 1956, filed October 15, 1952 (thiazoles, thiazolines, cyanine dyes, etc.). Also, it has been found that photosensitive products of especially high speeds are obtained when methyl-2-(N-methylbenzothiazolylidene) dithioacetate, of the formula

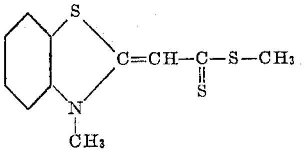

is used as the sensitizer.

The following non-restrictive examples illustrate the invention.

EXAMPLE 1

*Preparation of polyester of ethyleneglycol and cinnamylidenemalonic acid*

67.2 g. of ethylene glycol, 28 g. of cinnamylidenemalonic acid and 1.43 g. of p-toluenesulfonic acid were placed into a Vigreux flask, provided with an ordinary condenser. This is heated at ordinary pressure for two hours, while raising the temperature gradually from 150° to 190° C. A few ccs. of a distillate comprised of water and ethyleneglycol are gathered. At the end of this period, a vacuum of 0.5 mm. Hg is applied to the device for six hours, while keeping the temperature at 190° C. A light brown resin is obtained that melts at 80° C. and is comprised of a polyester, the repeating unit of which corresponds to the general Formula (II), where R represents the ethylene group and R′ the benzylidene group, and RR″ is a hydrogen atom.

A 5% solution of this resin in 2-methoxyethanol is prepared, 0.25% of benzoylmethylene-1-methyl-β-naphthothiazole is added, as a sensitizer, and the solution is coated on a grained aluminum plate. This is exposed for four minutes behind a screened negative, one meter away from two 20 amp. arcs, it is developed with acetone, dried, and the plate rubbed with a gum arabic solution having a pH value of 4. It is rinsed with water and inked with the pre-inking solution of the above-mentioned composition. The plate obtained can be used on an offset press.

Cinnamylidenemalonic acid can be prepared according to Liebermann's method (Bericht, 28, 1439) as indicated below. 132 g. of cinnamic aldehyde, 104 g. of malonic acid and 150 cc. of glacial acetic acid are heated for seven hours in a steam bath, and protected from the light. The yellow solid that is obtained is allowed to cool and is filtered. The product is washed with a little chloroform and recrystallized in 430 cc. of alcohol, M.P. 208° C. The yield is 54%. By diluting the recrystallization alcohol with water, the impure acid is reprecipitated which, after being redissolved in normal sodium hydroxide, is reprecipitated by means of hydrochloric acid and recrystallized in alcohol, which brings the yield to 58%. The addition of 50 cc. of acetic anhydride to the mother liquor makes it possible finally to recover a little more diacid. After recrystallization, the final yield is 61%. All of these operations are carried out in nonacetinic light.

EXAMPLE 2

*Preparation of polyester of ethylene glycol and ethyl cinnamylidenemalonate*

A mixture is prepared of 9 g. of anhydrous ethyleneglycol, 18 g. of ethyl cinnamylidenemalonate and three drops of a 20% solution of butyl titanate in butanol. While operating as described in Example 1, the mixture is heated at ordinary pressure for six hours, gradually bringing the temperature from 150° to 220° in order to distill off the ethyl alcohol that is formed. It is then heated for eight hours at 220° C. under a pressure of 1 mm. Hg. A light brown resin is obtained that melts at 80° C.

A 5% solution of this resin in 2-methoxyethyl acetate is prepared, 0.25% of 2-(benzoylcarbethoxymethylene)-1-methyl-β-naphthothiazole is added as a sensitizer and the solution is coated on a grained aluminum plate. After ten minutes of exposure behind a screened negative, at a distance of 35 cm. from a "Mazda MA–500" mercury vapor lamp, it is developed with trichloroethylene and treated as described in Example 1.

The ethyl cinnamylidenemalonate that is used in Example 2 is prepared in the following manner: A mixture of 32 g. (0.2 mole) of ethyl malonate, 26.4 g. (0.2 mole) of cinnamaldehyde and 20.4 g. (0.2 mole) of acetic anhydride is refluxed for five hours. This is first distilled at ordinary pressure in order to expel the acetic acid that is formed, and then it is distilled at a pressure of from 3 mm. to 5 mm. Hg. The ethyl malonate and then the cinnamaldehyde which have not reacted, distill over at about 66° C. and 105° C., respectively. The ethyl cinnamylidenemalonate (29 g.) distills over at about 150° C. (yield: 53%). By recrystallizing the ester at a very low temperature in 10 cc. of ethyl alcohol, yellow crystals are obtained that melt at 33° C. (yield: 36%).

The speed of the polyester of ethylene glycol and cinnamylidenemalonic acid, such as described in Examples 1 and 2, have been evaluated by proceeding in the following manner: A 5% polyester solution in 2-methoxyethyl acetate is prepared and coated on ground aluminum plates. The coatings are dried for a few minutes in warm air. The specimens are exposed through a sensitometric wedge to the light of a Mazda MA 500 mercury vapor lamp (placed at a distance of 35 cm.) or to the light of two 20 amp. arcs placed at a distance of one meter. After exposure, it is developed with trichloroethylene and the sensitometric characteristics of the undissolved areas, which appear like a sensitometric wedge, are evaluated by known photographic processes. From values found, a relative speed is attributed to the polyester. Evaluated according to this process, the speed of an unsensitized polyethylene cinnamylidenemalonate with a molecular weight of 2000, is from 80 to 110 for the specimens exposed to the mercury vapor lamp and about 200 for the specimens exposed to the arcs. As a comparison, a coating of bichromated gum lac would, under the same conditions, have a speed of about 50 with the mercury vapor lamp.

As already indicated, the speed can be increased by incorporating sensitizers in the coating composition. In the following table is indicated the speed, evaluated as above, of specimens of polyethylene cinnamylidenemalonates containing different sensitizers. The coating composition used for this evaluation is comprised of a mixture containing equal volumes of a 10% solution of the polyester in 2-methoxyethyl acetate and of a 5% solution (or a saturated solution) of the sensitizer in 2-methoxyethyl acetate.

TABLE I

| Sensitizer | Speed | |
|---|---|---|
| | U.V. Lamp | Arcs |
| 2-benzoylmethylene-1-methyl-β-naphthothiazole | 175 | 650 |
| 2-benzoylcarbethoxymethylene-1-methyl-β-naphthothiazole | 285 | 650 |
| 3,3′-diethyl-4,5,4′,5′-dibenzothiacarbocyanine chloride | 125 | 400 |
| 3-methylthiazolo-2-cyanine ethyl iodide | 100 | 250 |
| Bis-(2-acetylmethylamino-5-nitrophenyl)disulfide | 100 | 250 |
| Erythrosin | 125 | 400 |
| Brilliant Green | 100 | 250 |
| Michler's Ketone | 175 | ------- |
| 1-carbethoxy-2-keto-3-methyl-3-azabenzanthrone | 285 | ------- |
| Methyl 2-(N-methylbenzothiazolylidene)-dithioacetate | 400 | 1000 |
| 5-(3-methylbenzoxazolylidene)-2-thio-3-phenyl-thiazolone | 285 | 650 |
| 1-(ω-acetanilido)-δ-1,3-butadienylbenzothiazole ethyl iodide | 175 | 400 |
| Indolenine methyl iodide | 175 | 650 |

In a similar manner the sensitizing effect on the ethylene cinnamylidene malonate polymer of a number of other compounds which are also sensitizing agents for polyvinyl cinnamate, were compared with the results shown in the following table. On the same speed scale unsensitized polyvinyl cinnamate has a speed of 1.0 and unsensitized polyethylene cinnamylidene malonate a speed of 180. The tests are carried out using 2% polyester (weight-volume) and 10% sensitizing agent (based on weight of polyester) in methyl glycol acetate which in part accounts for the speed value of 2200 for the fourth compound compared to 1000 for the same compound in Table I tests.

TABLE II

| | Speed |
|---|---|
| Picramide | 350 |
| 2,4,7-trinitrofluorenone | 250 |
| p-Nitroaniline | 250 |
| Methyl-2-(N-methylbenzothiazoylidene)dithioacetate | 2200 |
| 2-benzoylmethylene-1-methyl-β-naphthothiazoline | 700 |
| N-methylbenzothiazolthione | 200 |
| Dibenzalacetone | 350 |
| Cinnamalacetophenone | 250 |
| 2,7-dinitrophenanthraquinone | 350 |
| 1,2-benzanthraquinone | 700 |

EXAMPLE 3

*Preparation of a polyester of propanediol-1,3 and ethyl cinnamylidenemalonate*

While operating as described in Example 2, 15.2 g. of propanediol-1,3, 27.4 g. of ethyl cinnamylidenemalonate and three drops of a 20% solution of butyl titanate in butanol are made to react. This is heated for eleven hours at 165° C. at ordinary pressure in order to distill off the alcohol, and it is then heated for thirty hours, from 165° to 200° C., under a pressure of 5 mm. Hg. A light brown resin is obtained that melts at 75° C. and is comprised of a polyester, the repeating unit of which corresponds to the general Formula II, where R represents the trimethylene group and R′ a phenyl group, R″ hydrogen.

A 5% solution of this resin in methyl glycol acetate is prepared, and the solution is coated on a granulated aluminum plate. After one minute exposure to the arc behind a screened negative, a negative is obtained which is developed with trichloroethylene. It is then treated as described in Example 1.

By adding a sensitizer, such as benzoylmethylene-1-methyl-β-naphthothiazole, the time of exposure to the arc can be reduced to thirty seconds.

EXAMPLE 4

*Preparation of a polyester of butanediol-1,4 and ethyl cinnamylidenemalonate*

While operating as described in Example 3, 19 g. of butanediol-1,4, 27.4 g. of ethyl cinnamylidenemalonate and three drops of a 20% solution of butyl titanate in butanol are made to react. A light brown resin is obtained that melts at 60° C. and is comprised of a polyester, the repeating unit of which corresponds to the general Formula II, where R represents the tetramethylene group, R′ the phenyl group, R″ is hydrogen.

A 5% solution of this resin in methylglycol acetate is prepared, to which 0.25% of 2-(benzoylcarbethoxymethylene)-1-methyl-β-naphthothiazole is added as a sensitizer, and the solution is coated on a granulated aluminum plate. After a minute and a half, exposure to the arc behind a screened negative, a plate is obtained that is developed and treated as indicated in the previous examples.

EXAMPLE 5

*Preparation of a polyester of p-dihydroxymethyl benzene and ethyl cinnamylidenemalonate*

While operating as described in Example 3, 27.6 g. of p-dihydroxymethylbenzene, 27.4 g. of ethyl cinnamylidenemalonate and three drops of a 20% solution of butyl titanate in butanol. The duration of the heating under a vacuum is twenty-one hours, from 165° to 185° C. A light brown resin is obtained that is very hard, melts at 100° C., and is comprised of a polyester, the repeating unit of which corresponds to the general Formula II, where R represents the

group, R′ the phenyl group and R″ is hydrogen.

A 5% solution of this resin in methylglycol acetate is prepared, to which 0.25% of benzoylmethylene-1-methyl-β-naphthothiazole is added as a sensitizer, and the solution is coated on a granulated aluminum plate. After one minute of exposure to the arc, behind a screened negative, a plate is obtained that is developed and treated as described above.

EXAMPLE 6

*Preparation of a polyester of ethyleneglycol and ethyl crotonylidenemalonate*

While operating as described in the preceding examples, 21.2 g. (0.1 mole) of ethyl crotonylidenemalonate, 12.5 g. (0.2 mole) of ethyleneglycol and two drops of a 20% solution of butyl titanate are placed in a glass flask. This is heated for five and one-half hours at 160° C., at ordinary pressure, and then for one hour at 160° C., under a pressure of 1 mm. Hg. Any prolongation of heating and any elevation of temperature above 160° C. must be avoided.

In this way a photosensitive resin is obtained that is comprised of a polyester of the formula

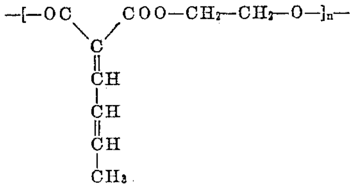

The ethyl crotonylidenemalonate used in Example 6 is prepared in the following manner by proceeding according to the method described by A. Anvers and J. Heyna in Ann., 434, 140 (1923). 160 g. (1 mole) of ethyl malonate, 70 g. (1 mole) of crotonaldehyde, 400 cc. of methylene chloride and 6 cc. of piperidine are put into a two-liter, three-necked flask that is provided with an agitator and connected to a solvent-type water extraction device. It is refluxed for twenty-five hours, while agitating. The methylene chloride is expelled by distillation in a steam bath, then the remaining mixture is fractionated under vacuum. Crotonaldehyde and ethyl malonate are separated and then 62 g. of ethyl crotonylidenemalonate (142° C. $_{12\ mm.}$). The yield is 29%.

EXAMPLE 7

*Preparation of a polyester of ethyleneglycol and ethyl crotonylidene-γ-methylmalonate*

While operating as described in the preceding examples, 11.3 g. (0.05 mole) of ethyl γ-methylcrotonylidenemalonate, 6.2 g. (0.1 mole) of ethyleneglycol and three drops of a 20% solution of butyl titanate in butanol. This is heated for four hours and a half at 170° C., at ordinary pressure, and then for four and a half hours from 170° C. to 200° C., under a pressure of 4 mm. Hg.

In this way a photosensitive resin is obtained that is comprised of a polyester of the formula

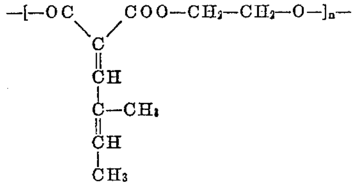

The ethyl γ-methylcrotonoylidenemalonate used in Example 7 is prepared by proceeding as for the preparation of ethyl crotonylidenemalonate, but by reacting 32 g. (0.2 mole) of ethyl malonate, 16.2 g. (0.2 mole) of tiglic aldehyde, 300 cc. of methylene chloride and 3 cc. of piperidine. This is refluxed for twelve hours while agitating. The methylene chloride is expelled in a steam bath and the products obtained are fractionated under vacuum. The desired ester distills over at 140° C. under 5 mm. Hg. The yield is 25%.

EXAMPLE 8

*Preparation of a polyester of ethylglycol and ethyl o-nitrocinnamylidenemalonate*

Following the usual process of trans-esterification, 8 g. (0.025 mole) of ethyl o-nitrocinnamylidenemalonate, 3.1 g. (0.05 mole) of ethyleneglycol and three drops of a 20% solution of butyl titanate in butanol. This is heated for three hours at 170° C. at ordinary pressure, then for four hours at 170° C. under a pressure of 8 mm. Hg. A photosensitive resin is obtained that is comprised of a polyester of the formula

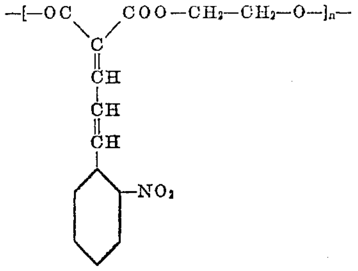

For preparing the ethyl o-nitrocinnamylidenemalonate used in Example 8, first o-nitrocinnamaldehyde is prepared by proceeding as described by W. Davey and J. R. Owild in J. Chem. Soc. (1955), 1384. For this, 105 g. (0.8 mole) of cinnamaldehyde and 500 cc. of acetic anhydride are mixed together. In an hour, 5.3 cc. of 85% phosphoric acid (specific gravity =1.71) is added, while keeping the temperature between −5° C. and 0° C. by adding Dry Ice. At the same temperature, in a half an hour, 35 cc. of nitric acid is added. It is agitated for two hours, while allowing the temperature to raise gradually to room temperature. The product is poured into four litres of water. This is acidified slowly (fifteen minutes) by adding 250 cc. of hydrochloric acid (specific gravity=1.16). It is allowed to stand until the next day. In this way a mixture of aldehyde and diacetate is obtained that is filtered and the solid is dissolved in 600 cc. of ethanol. This is acidified by means of 40 cc. of sulfuric acid (specific gravity=1.84) diluted with 400 cc. of water. It is refluxed for two hours. By cooling, a precipitate of o-nitrocinnamaldehyde (64 g.; 45%) is obtained. After recrystallization and passage through bone black, 46 g. of pure product is obtained that melts at 127° C. (32.5%).

Beginning with the thus obtained o-nitrocinnamaldehyde, the ethyl o-nitrocinnamylidenemalonate is prepared by refluxing for fourteen hours a mixture of 17.7 g. (0.1 mole) of o-nitrocinnamaldehyde, 16 g. (0.1 mole) of ethyl malonate, 500 cc. of methylene chloride and 1.5 cc. of piperidine. The solvent is expelled by distillation. The solid that is obtained is recrystallized in alcohol. Melting point=89° C. Yield=28%.

EXAMPLE 9

*Preparation of a polyester of ethyleneglycol and ethyl α-naphthylallylidenemalonate*

Following the usual method of polyesterification, 16 g. (0.05 mole) of ethyl α-naphthylallylidenemalonate, 6.2 g. (0.1 mole) of ethyleneglycol and two drops of a 20% solution of butyl titanate in butanol are made to react. This is heated for three hours at 180° C. at ordinary pressure, then for ten hours at a pressure of 3 mm. Hg. A photosensitive resin is obtained that is comprised of a polyester of the formula:

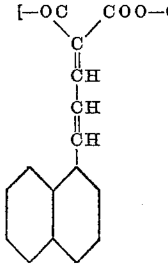

For preparing the ethyl α-naphthylallylidenemalonate used in Example 9, we pass through α-naphthaldehyde then α-naphthylacroleine, prepared as described by Israelaslivili, J. Org. Chem. 16, 1519 (1951). To obtain the α-naphthaldehyde, a mixture of 1900 cc. of acetic acid, 127 g. of potassium iodide (in 127 cc. of water), 560 g. (4 moles) hexamethylenetetramine and 700 g. (approx. 4 moles) of α-chloromethylnaphthalene is refluxed for ten hours. After cooling, it is poured into water, allowed to decant, and the organic phase is separated and distilled in a vacuum (170° C. at 22 to 25 mm.), and 383 g. of aldehyde is obtained (yield: 62%). 385 g. (2.46 moles) of thus prepared α-naphthaldehyde, 1900 cc. of ethyl alcohol and 15.3 cc. of caustic soda are mixed together in a three-liter, three-necked flask, provided respectively with an agitator, a thermometer and a dropping funnel, while keeping the temperature at 0° C. Besides, 123 g. of acetaldehyde is poured drop by drop into 300 cc. of ethyl alcohol, while cooling greatly in order to avoid vaporization. This solution is added drop by drop to the preceding solution, in one hour while agitating and keeping the temperature at 0° C. It is then agitated for one hour at 5° C., then for four hours at 15° C. It is poured into water in order to separate the red oil that has formed. The aqueous layer is extracted by means of ether, and the ethereal solution is added to the obtained product. By distilling on a water bath some ether, a little water and alcohol are obtained successively in a slight vacuum, and then 142 g. of α-naphthylacroleine at 195° C. under a pressure of 6 mm. Hg. A rather large residue remains in the flask. Yield: 41%.

Beginning with the thus obtained α-naphthylacroleine, the ethyl naphthylallylidenemalonate is prepared by refluxing for nineteen hours, a mixture of 60 g. (0.33 mole) of α-naphthylacroleine, 53 g. (0.33 mole) of ethyl malonate, 250 cc. of methylene chloride and 5 cc. of piperidine. At the tenth hour a new quantity (3 cc.) of piperidine is added. 15.5 g. of ester is obtained by fractionation under vacuum (235°–243° C. at 5 mm.).

EXAMPLE 10

*Preparation of a polyester of ethyleneglycol and ethyl furfurylallylidenemalonate*

First, some ethyl furfurylidenemalonate is prepared, beginning with furfural and passing through furanacroleine.

*Preparation of 2-furanacroleine.*—We proceed according to the method described by M. V. Likhosherstov, A. A. Arsenyuk, E. F. Zeberg and I. V. Karitskaya in Zhur. Obshoher Khim., 20, 627–634 (1950): 1400 cc. of water and 7 g. of caustic soda are put into a three-liter, three-necked flask, the necks of which are provided respectively with an agitator, a thermometer and a dropping funnel, and the flask is cooled by a mixture of ice and salt. When the solution is at 0° C., 100 g. of furfural is poured into it in from ten to fifteen minutes, then a solution of 60 g. of acetaldehyde in 300 cc. of water in five minutes. The furanacroleine precipitates in proportion to the reaction, the temperature being kept at 0° C. Agitation is then stopped and it is allowed to stand for two hours. 108 g. of furanacroleine is filtered out (yield: 85%). The aldehyde can be purified by distillation with steam, crystallization in a mixture of water and methanol or distillation under a vacuum at 80° C. The yield in pure product is 70%.

*Preparation of ethyl 2-furfurylidenemalonate.*—A mixture of 160 g. (1 mole) of ethyl malonate, 61 g. (0.5 mole) of 2-furanacroleine, 150 cc. of anhydrous pyridine and 1 cc. of piperidine is refluxed for thirty-two hours in a one-liter flask, on which is mounted a reflux condenser. After cooling, the mixture is poured over crushed ice, and the mixture is acidified with concentrated hydrochloric acid until it turns a Congo red tone. The oily phase is separated, it is washed several times in water, and it is then rectified under reduced pressure. First we collect the excess of malonate and a little 2-furanacroleine; the ethyl furfurylidenemalonate (90 g.) distills over at about 165° C. at a pressure of 1 mm. Hg (yield: 68%).

The ethyl 2-furfurylidenemalonate can also be prepared by using the method and device described in Example 6 for the preparation of ethyl crotonylidenemalonate. A mixture of 122 g. (1 mole) of 2-furanacroleine, 160 g. (1 mole) of ethyl malonate, 500 cc. of anhydrous methylene chloride and 5 cc. of piperidine is refluxed for thirty hours. After this time it is separated, and the ester that is obtained is distilled (yield: 58%).

Beginning with ethyl 2-furfurylidenemalonate, the polyethylenefurfurylidenemalonate is prepared by submitting a mixture of 152 g. (0.57 mole) of the ester, 71 g. (1.15 moles) of ethyleneglycol and 0.5 cc. of a 20% solution of butyl titanate in butanol to polyesterification according to the usual method. It is heated for seventeen hours at ordinary pressure while raising the temperature gradually from 150° to 180° C., and it is then heated for one hour at 170° C. at a pressure of 0.5 mm. Hg. A photosensitive resin is obtained that is comprised of a polyester of the formula:

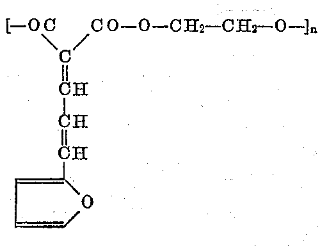

EXAMPLE 11

*Preparation of a polyester of butanediol and ethyl N-methylpyridylidene-2-ethylidenemalonate*

A mixture of 8.7 g. (0.033 mole) of ethyl N-methylpyridylidene-2-ethylidenemalonate, 6 g. (0.066 mole) of butanediol-1,4 and three drops of a 20% solution of butyl titanate in butanol is submitted to polyesterification. It is heated for five hours at 165° C. at ordinary pressure, then for eight and a half hours at the same temperature, at a pressure of 6 mm. Hg. A photosensitive resin is obtained that is dark green with metallic reflections and brown in solution. It is comprised of a polyester of the formula:

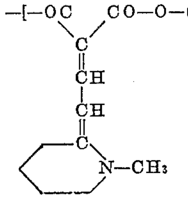

A 0.0025% solution of this resin in methylene chloride displays maximum sensitivity at about 440 millimicrons.

The ethyl N-methylpyridylidene-2-ethylidenemalonate is prepared in a known manner: 63 g. (0.5 mole) of methyl sulfate and drop by drop and while agitating, 56.5 g. (0.5 mole) of α-picoline are put into a one-liter flask that is cooled by means of Dry Ice. It is heated for ten hours in a steam bath and allowed to stand until the next day, at room temperature. Then, 108 g. (0.5 mole) of ethyl ethoxymethylenemalonate (Org. Synth. Coll., vol. III, p. 195) and 20 g. (0.5 mole) of caustic soda in 500 cc. of anhydrous alcohol are added. This is allowed to stand for twenty-four hours. Sodium sulfate crystals appear in the flask. It is refluxed for one hour, filtered, and poured into a saturated aqueous solution of sodium sulfate. A red oil is obtained that is separated and treated under vacuum at 100° C. (42 g.). On the other hand, the precipitating aqueous solution is extracted with methylene chloride. After evaporating the solvent, another oil is collected which, after treatment under vacuum, yields 20 g. of product. The gross yield is 45%.

EXAMPLE 12

*Preparation of a polyester of butanediol-1,4 and ethyl N-methylquinolylidene-2-ethylidenemalonate*

A mixture of 32.7 g. (0.1 mole) of ethyl N-methylquinolylidene-2-ethylidenemalonate, 18 g. (0.2 mole) of butanediol-1,4 and three drops of a 20% solution of butyl titanate in butanol is submitted to trans-esterification according to the usual method. First of all, it is heated for seven hours at 165° C., at ordinary pressure, then for five hours at 175° C. at a pressure of 5 mm. Hg. A resin is obtained that has a dark green metallic lustre and is red in solution and is sensitive to visible radiations. It is comprised of a polyester of the formula:

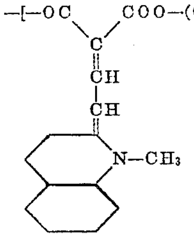

The ethyl N-methylquinolylidene-2-ethylidenemalonate used in Example 12 is prepared in the following manner: 200 g. (1.4 moles) of quinaldine and 260 g. (1.4 moles) of methyl p-toluene-sulfonate are put into a two-liter flask provided with a reflux condenser. This is heated very gently up to 120°–130° C. and kept at this temperature for four hours. After cooling, the quaternary salt that is obtained is crushed and put into a two-liter flask with 1000 cc. of anhydrous pyridine and 310 g. (1.4 moles) of ethyl ethoxymethylenemalonate. It is brought to a boil for forty-five minutes and, after cooling, is poured into a ten-liter crystallizing dish containing crushed ice. It is then allowed to stand for forty-eight hours. The precipitate is filtered, dried and extracted with benzene in a Soxhlet extractor. A metallic green product remains in the thimble of the extractor. By evaporating the benzene solution, the desired product is obtained in the form of red-brown crystals that melt at 120°–121° C. (138 g.). The aqueous filtrate is extracted with benzene in a separating funnel, and 20 g. more of the product is collected. The total yield is 48% (158 g.).

EXAMPLE 13

*Preparation of a polyester of butanediol-1,4 and ethyl N-methylbenzothiazolylidene-2-ethylidenemalonate*

A mixture of 33.3 g. (0.1 mole) of ethyl N-methylbenzothiazolylidene-2-ethylidenemalonate, 18 g. (0.2 mole) of butanediol-1,4 and three drops of a 20% solution of butyl titanate in butanol is submitted to trans-esterification. It is heated for six hours at 180° at ordinary pressure, then for four hours at a pressure of 5 mm. Hg while raising the temperature gradually to 200° C. A dark brown resin is obtained that is brown in solution and is comprised of a polyester of the formula:

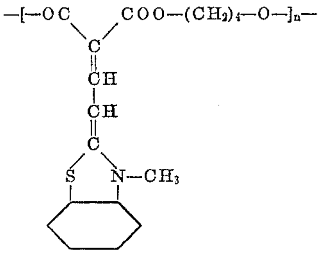

This resin in solution at 0.0025% in methylene chloride, has a maximum sensitivity of about 440 millimicrons.

The ethyl N-methylbenzothiazolylidene-2-ethylidene malonate can be prepared in the following manner: 30.5 g. (1.05 moles) of 2-methylbenzothiazole methyl iodide, 25 g. (1.25 moles) of ethyl ethoxymethylenemalonate and 120 cc. of pyridine are put into a half-liter flask. This is refluxed for one hour and, after cooling, it is poured over crushed ice. The oil that floats on the surface is separated, and it is treated under vacuum at 100° S. It is then extracted in a Soxhlet apparatus.

The polymeric compounds according to the invention, such as those that have been described in the preceding examples, are particularly utilizable in the photomechanical reproduction processes where it is necessary to make an image-forming resist on a support. For example, the polymeric compound dissolved in a solvent is coated on a support such as a metal plate, on paper, or on the surface of an organic colloid and, more especially, on a support that, when wet, repels oily printer's ink, such as a lithographic paper. After exposure to a dotted or screened image, the unexposed areas are eliminated by dissolution so as to leave only the image-forming resist on the support. Under these conditions, if the resist has been formed on a surface that is repellant to oily inks when this surface is wet, the support bearing the resist can be used directly as a printing block. In other applications, for example, when the support is a smooth or grained metallic plate, after developing the resist the etching can be carried out in the usual manner to obtain a metallic printing block.

In the case where the support is a smooth metallic plate, it is advantageous to increase the adhesion of the photosensitive resins according to the invention and obtain a covering power that is sufficient to permit correct developing by organic solvents and to protect the metal in the course of the etching. According to the invention, this result is obtained by incorporating in the photosensitive resin a non-sensitive polymer of the type used for the preparation of protective varnishes for metals. The non-sensitive polymer that is used must be compatible with the cinnamylidenemalonate polyester or other polyester according to the invention and soluble in the solvent used for the coating of the polyester; moreover, it must dry rapidly, permit a correct developing of the negatives and resist the etching baths. It has been found, according to the invention, that the derivatives of polyesters, when used for this purpose, produce satisfactory results. Other non-sensitive polymers that can be used are, for example, polymethyl methacrylate.

The following non-restrictive examples illustrate this embodiment of the invention:

EXAMPLE 14

The following composition is coated on a 0.04 mm. thick copper plate on a 1.5 mm. thick "Dilecto" support:

| | Percent |
|---|---|
| Polyethylene cinnamylidenemalonate | 13.5 |
| Valdur 03902 LA (Valentine) | 10 |
| Methylglycol acetate | 76.5 |

The photosensitive product thus prepared can be used for the production of printed electrical circuits.

EXAMPLE 15

The following composition is coated on a metallic plate identical to that of Example 14:

| | Percent |
|---|---|
| Ethylene polycinnamylidenemalonate | 12 |
| SE 30 A (Clement-Riviere) | 10 |
| Methylglycol acetate | 78 |

The thus prepared photosensitive product can be used for the production of printed electrical circuits.

EXAMPLE 16

A 6% solution of sensitized polyethylene cinnamylidenemalonate and 0.3% methyl polymethacrylate in a 90% mixture of methylglycol acetate and 10% acetone is coated on a metallic plate that is identical to that of Example 14. The photosensitive product thus obtained can be used, for example, for the production of printed circuits.

Polymers similar to those described above but which are soluble in aqueous solutions (as their alkali metal salts) can readily be prepared by utilizing, for example, a sulfonated or carboxylated 2-pentenylidene malonic compound for reaction with the glycols. Similarly, polymers such as those of Examples 11, 12 and 13 containing tertiary nitrogen atoms can readily be quaternized, e.g., using dialkyl sulfates, alkyl esters of sulfonic acids, etc. This is illustrated particularly by the following example:

EXAMPLE 17

*Preparation of polyester of butanediol-1,4 and ethyl p-dimethylaminocinnamylidene malonate*

*p-Dimethylaminocinnamaldehyde.*—In a one liter balloon flask were placed 500 cc. of sulfuric acid (d.=1.83) and 74.5 g. of p-dimethylaminobenzaldehyde cooled to −12° C. While stirring, 50 cc. of paraldehyde were added in small portions maintaining the temperature below 0° C. The temperature was allowed to arise slowly to room temperature in 3 hours. The chestnut colored product was then neutralized with a solution of 1100 g. of sodium carbonate in 5000 cc. of water. After standing overnight, the product was filtered and recrystallized from ethanol. M.P. 130° C. (yield 28.5%).

*Ethyl p-dimethylaminocinnamylidene malonate.*—The following materials were heated under reflux in a balloon flask provided with a receiver until the formation of water ceased:

| | | |
|---|---|---|
| p-Dimethylaminocinnamaldehyde | grams | 25 |
| Ethyl malonate | do | 30 |
| Benzene (anhydrous) | cc | 300 |
| Piperidine | do | 5 |

The benzene was then distilled out and a little alcohol added to crystallize the product. After recrystallization from alcohol (using charcoal) a crystalline product was obtained in plates M.P., 113–115° C. Yield 50%.

The polyester having the formula

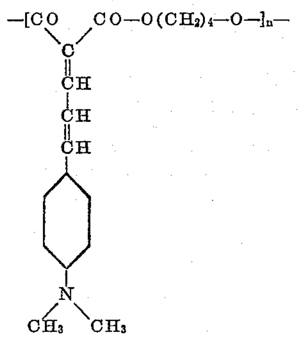

was obtained by heating the following mixture:

| | | |
|---|---|---|
| Butanediol-1,4 | grams | 9 |
| Ethyl p-dimethylaminocinnamylidene malonate | do | 16 |
| 20% butyl titanate | drops | 4 |

for 6 hours at 180° C. at atmospheric pressure, then 7½ hours at 200° C. under reduced pressure (5 mm. Hg). An organic solvent-soluble reddish polymer resulted which was light-sensitive and could be sensitized with the mentioned sensitizers.

*Quaternized polyester.*—The above polyester was quaternized by heating it under reflux with an excess of methyl iodide. After heating for some hours the product precipitated and the excess methyl iodide was allowed to evaporate. The product was soluble in water, insoluble in organic solvents and light-sensitive (using water to develop an exposed coating on aluminum sheeting). The quaternized polymer had the interesting property of being capable of reverting to the original unquaternized form upon heating to 100° C. This property can be utilized in making printing plates by forming a resist image on a support such as a metal plate by exposing a coating thereon, developing with water and heating the resist image to about 100° C. to cause the resist image to become even more hydrophobic and resistant to etching baths.

Similar quaternized polyesters can be prepared using other quaternizing agents, for example, allyl iodide or benzyl iodide in place of methyl iodide in the above procedure.

The polymeric compounds according to the invention can also be used to form soluble or insoluble, continuous or interrupted coatings on any surface or any object to which they adhere; exposure to light being utilized to assure insolubility in the second case.

The compounds according to the invention can also be used for silk screen printing. A solution of the selected compound is coated in the usual manner on a bolting cloth, the sensitized bolting cloth is exposed to a mercury vapor lamp through a negative, and the unexposed areas are removed by dissolution. The silk screen negative thus prepared is ready for use in the known manner.

The resins according to the invention are also suitable as supports for pigments or dyes for decorative applications, for example, for obtaining monochromatic or polychromatic images or for the preparation of fluorescent designs or conductors of electricity. For such applications, the desired ingredient (pigment, dye, etc.) is incorporated in the composition containing the photosensitive resin, it is exposed and then developed in order to obtain insoluble images that contain said ingredient on any appropriate support, such as wood, metal, paper, glass, fabric, natural or synthetic polymers, etc.

In addition, the resins according to the invention can be used as dielectrics for electrical insulation and, as such, they can be used in the known methods of electrostatic printing.

The photosensitive polyesters prepared according to the invention can also be used for the photographic reproduction in relief of screened or continuous toned documents. In this latter case, it is preferable to coat the polyester on a transparent support, expose the layer through the support, and remove the least exposed areas by washing with a solvent, thus leaving a continuous relief image on the support that can be colored first or later with subtractive dyes. One can also superimpose three reliefs that have been colored in this way by means of subtractive dyes and each one of which corresponds to green, red or blue areas of the subject, in order to obtain a reproduction in natural colors. Three images can also be formed on the single support by applying on it, successively, layers of polyester, first forming reliefs corresponding to one or more of the red, green or blue components of the original. For example, after having formed a yellow colored relief on the support, a layer of polyester is superimposed and a magenta relief is formed in that layer, then, in a like manner, a blue-green relief is formed.

The invention is not limited to the described embodiments, which are selected only as examples.

What we claim is:

1. A photographic element comprising a support having thereon a layer of a light-sensitive film-forming linear polyester of a bifunctional glycol containing from 2 to 12 carbon atoms and a compound having the general formula $$R'{=}\underset{\displaystyle R}{\underset{|}{C}}{-}CH{=}C\begin{matrix} / COOH \\ \backslash COOH \end{matrix}$$

wherein R represents a member of the class consisting of a hydrogen atom and a lower alkyl group, and R′ represents a member of the class consisting of radicals of the benzylidene, α-naphthylidene and 2-furfurylidene series, and ethylidene, 3-methyl-2-(3H)-benzothiazolylidene, 1-methyl-2-(1H)-pyridylidene and 1-methyl-2-(1H)-quinolylidene radicals.

2. The element of claim 1 in which the surface of the support carrying the layer of polyester is hydrophilic.

3. A photographic element comprising a support having thereon a layer of a light-sensitive film-forming linear polyester of cinnamylidene malonic acid and a bifunctional glycol containing from 2 to 12 carbon atoms.

4. A photographic element comprising a support having thereon a layer of a light-sensitive film-forming linear polyester of cinnamylidene malonic acid and ethylene glycol.

5. A method for preparing a printing plate which comprises exposing to a subject an element including a support having thereon a layer of a light-sensitive film-forming linear polyester of a bifunctional glycol containing from 2 to 12 carbon atoms and a compound having the general formula $$R'{=}\underset{\displaystyle R}{\underset{|}{C}}{-}CH{=}C\begin{matrix} / COOH \\ \backslash COOH \end{matrix}$$

wherein R represents a member of the class consisting of a hydrogen atom and a lower alkyl group, and R′ represents a member of the class consisting of radicals of the benzylidene, α-naphthylidene and 2-furfurylidene series, and ethylidene, 3-methyl-2-(3H)-benzothiazolylidene, 1-methyl-2-(1H)-pyridylidene and 1-methyl-2-(1H)-quinolylidene radicals until said polyester has become insoluble in the region of exposure, and removing the polyester from the support only in the unexposed regions by means of a solvent for the polyester.

6. A light-sensitive composition comprising (1) a light-sensitive film-forming linear polyester of a bifunctional glycol containing from 2 to 12 carbon atoms, and a compound having the general formula $$R'{=}\underset{\displaystyle R}{\underset{|}{C}}{-}CH{=}C\begin{matrix} / COOH \\ \backslash COOH \end{matrix}$$

wherein R represents a member of the class consisting of a hydrogen atom and a lower alkyl group, and R′ represents a member of the class consisting of radicals of the benzylidene, α-naphthylidene and 2-furfurylidene series, and ethylidene, 3-methyl-2-(3H)-benzothiazolylidene, 1-methyl-2-(1H)-pyridylidene and 1-methyl-2-(1H)-quinolylidene radicals and (2) a light-sensitizing agent of the class consisting of methyl-2-(N-methylbenzothiazolylidene)-dithioacetate, 2-benzoylmethylene-1-methyl-β-naphthothiazole, 2-benzoylcarbethoxymethylene-1-methyl-β-naphthothiazole, 5-(3-methylbenzothiazolylidene)-2-thio-3-phenylthiazolene and indolenine methyl iodide.

7. The composition of claim 6 wherein the light-sensitizing agent is methyl-2-(N-methylbenzothiazolylidene)-dithioacetate.

8. The composition of claim 6 wherein the polyester is a polyethylene cinnamylidene malonate.

9. A photographic element comprising a support having thereon a layer of a light-sensitive film-forming linear condensation polyester of a bifunctional glycol containing from 2 to 12 carbon atoms and a member of the class consisting of o-nitrocinnamylidene malonic acid, cinnamylidene malonic acid, crotonylidene malonic acid, γ-methylcrotonylidene malonic acid, α-naphthallylidene malonic acid, furfurylallylidene malonic acid, N-methylpyridylidene-2-ethylidene malonic acid, N-methylquinolylidene-2-ethylidene malonic acid, and N-methylbenzothiazolylidene-2-ethylidene malonic acid.

References Cited in the file of this patent

UNITED STATES PATENTS

| | | |
|---|---|---|
| 2,732,301 | Robertson et al. | Jan. 24, 1956 |
| 2,759,820 | Neugebauer et al. | Aug. 21, 1956 |
| 2,760,863 | Plambeck | Aug. 28, 1956 |